Dec. 25, 1962  J. L. FRENCH  3,069,791
SCRAPERS

Filed July 26, 1960  2 Sheets-Sheet 1

FIG. I

INVENTOR.
J.L. FRENCH
BY W.A. Murray
ATTORNEY

Dec. 25, 1962  J. L. FRENCH  3,069,791
SCRAPERS
Filed July 26, 1960  2 Sheets-Sheet 2
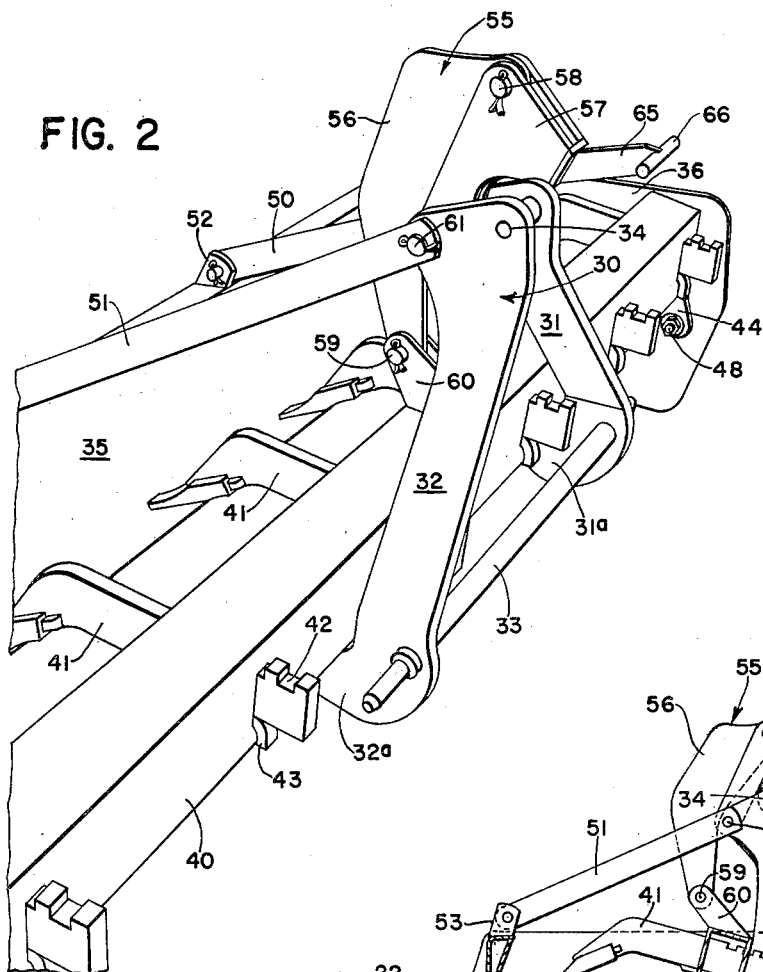
FIG. 2
FIG. 4
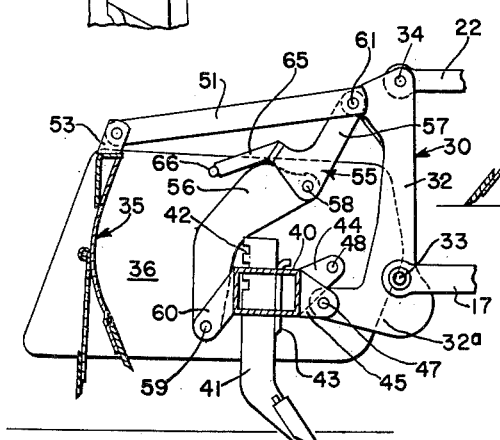
FIG. 3
INVENTOR.
J. L. FRENCH
BY W. A. Murray
ATTORNEY 3,069,791
SCRAPERS
John L. French, Moline, Ill., assignor to Deere & Company, Moline, Ill., a corporation of Delaware
Filed July 26, 1960, Ser. No. 45,339
7 Claims. (Cl. 37—145)

This invention relates to a combination scraper-scarifier implement of the type which is normally mounted on the rear of a tractor. More particularly this invention relates to a new and novel method of interconnecting the scraper portion of the implement and the scarifier portion of the implement whereby either may be easily raised or lowered into its ground-working position.

The combining in a single implement of a scarifier type tool with that of a scraper type tool is, of course, not new. However, there are certain inherent problems created in combining the two. Primary among these is raising and lowering the individual tools since it is inherent in the operation of the combination scraper-scarifier implement that only one of the tools should be in ground-engaging position at a time. For example, it is desirable in one instance to raise the blade from contact with the ground while at the same time driving the scarifier teeth in the ground. This is generally followed by lowering the blade into contact with the ground while at the same time raising the scarifier teeth. Consequently it is desirable in this type of implement to have a means for quickly and easily raising and lowering the individual tools, the most desirable condition being such that either of the tools may be raised and lowered from the tractor seat.

It is the main purpose of the present invention to provide a scraper-scarifier implement in which the scarifier tool and the scraper tool are pivotally interconnected and are adjustable relative to one another so that as one of the tools is lowered, the other automatically raises.

It is a further purpose of the present invention to provide in the above-described implement a manually adjustable linkage which raises and lowers the scarifying tool and the scraper tool and has over-center locking disposition when either tool is in its operational or non-operational position.

It is a further purpose of the present invention to so interconnect the scarifying tool and the scraper tool that the gravitational effect of one of the tools as it is lowered operates to counter-balance or to lift the other tool.

Other objects and advantages of the present invention will become apparent to those skilled in the art as the nature of the invention is better understood from the following description and as shown in the accompanying drawings.

FIG. 2 is a perspective view taken from one side and slightly forwardly of the implement in its detached condition from the tractor.

FIG. 3 is a longitudinal vertical sectional view of the implement showing the scarifying teeth in ground-engaging position.

FIG. 4 is a view similar to FIG. 3 showing the scraper blade in ground-engaging position.

Figure 1:
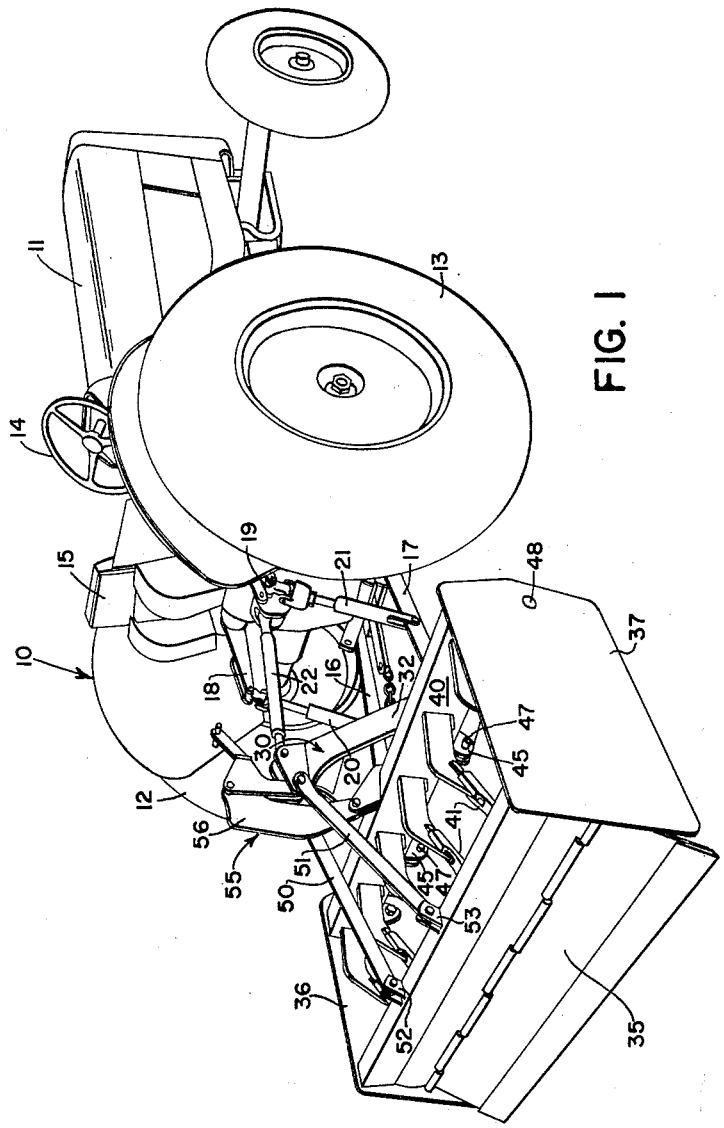
FIG. 1 is a rear perspective view taken slightly to one side of the scraper-scarifier implement and including a part of a tractor.

Referring now to the drawings, there is provided a tractor 10 having a fore-and-aft extending tractor body 11 supported at its forward end by front steerable wheels and at its rear end by large traction wheels 12, 13. The tractor 10 is provided with an operator's station as indicated by the steering wheel 14 and tractor seat 15. Extending rearwardly from the tractor body 11 is a hitch device including a pair of trail-behind links 16, 17 raised and lowered by hydraulically operated lift arms 18, 19 through connecting links 20, 21. An upper trail-behind link 22 extends rearwardly from the tractor body 10 and operates generally as the stabilizing arm or member for the hitch device.

The implement includes a forward upright A-frame 30 composed of a pair of diverging leg portions 31, 32 interconnected at their lower ends by a transverse brace or bar 33, the outer ends of which serve as pivotal connections for the drawbar links 16, 17. The upper ends of the leg portions 31, 32 converge to an apex area which receives the upper trail-behind link 22, a pin 34 being provided as the means of connecting the trail-behind link to the apex portion of the frame 30. The lower ends of the leg portions 31, 32 extend rearwardly as at 31a, 32a.

A transverse scraper blade 35 is disposed spacedly rearwardly of the frame 30 and has transversely spaced ends disposed slightly outwardly of the outer faces of the traction wheels 12, 13. Extending forwardly from the outer ends of the blade 35 is a pair of side plates or arms 36, 37.

Positioned adjacent to the frame 30 and spacedly forwardly of the transverse blade portion 35 is a hollow rectangular shaped transverse beam 40. Extending through the beam is a series of transversely spaced scarifier teeth 41. The teeth 41 have at their upper end or the end adjacent to the beam 40 a series of notches 42 in which the plate forming the upper side of the beam 40 may seat. A drop pin 43 lies against the edge of each tooth 41 and prevents separation of the beam from the respective notches 42. As is readily apparent from viewing the drawings, the location of the beam relative to the notches 42 determines to a degree the amount of depth that the respective teeth 41 may cut.

Opposite ends of the transverse beam 40 lie adjacent to the inner surface of the side or end panels 36, 37. Extending forwardly from a wall of the hollow beam 40 and on opposite ends of the beam 40 is a pair of rigid brackets, one of which is shown at 44, having transversely alined openings defining a transverse horizontal pivot. The latter openings receive a pivot pin or bolt 48. The brackets 44 and their respective pivotal connections at opposite ends of the beam are identical. The entire blade, composed of the blade portion 35 and in its respective forwardly directed end panels 36, 37, which in a sense operate as arm structures, may be swung or moved vertically relative to the beam 40 about the transverse pivot defined by the last mentioned pivot pin 48. A second pair of bracket structures 45 extend forwardly from the beam 40 and have at their outer ends alined openings which form a second transverse horizontal pivot. The brackets 45 lie adjacent to the rearwardly projecting portions 31a and 32a of the main frame 30 and are connected thereto by pivot pins 47. As may be seen clearly from viewing FIGS. 3, 4 the entire beam 40 may swing vertically from one position rearwardly of the pivot pins 47 to a second position above the pivot pins 47. Likewise, the blade 35 may swing above pivot pins 48 which connect the brackets 44 to the side walls 36, 37 so that the blade 35 may move between ground-engaging position and a position spacedly above the ground. A pair of stabilizing links 50, 51 extend from the upper apex portion of the A-frame 30 rearwardly and outwardly to brackets 52, 53 respectively extending upwardly from the upper edge of the blade 35.

Means for raising and lowering the transverse beam portion 40 and, as will later become apparent, for raising and lowering the blade 35 is a linkage 55 extending from the apex portion of the A-frame 30 to the beam 40. The linkage 55 is composed of a pair of links 56, 57 pivotally interconnected by pivot pin 58. The link 56 is pivotally connected by pin 59 at its lower end to the beam 40, a rigid bracket structure 60 extending from the rear surface of the beam 40 to receive the pin 59. The upper link 57 is connected to the apex portion of the A-frame 30 by means of a pivot pin 61, the latter also being used to connect the stabilizing links 50, 51 to the apex portion of the frame 30. As is clearly evident from the drawings, the link 56 is arched or curved so that upon the linkage being in a retracted position as shown in FIG. 4, the relation of pivot pins 58, 59 and the associated links 57, 56 is such as to create an over-center lock with the pivot pin 61. Likewise, upon the linkage being in its extended condition as shown in FIG. 3, the relation of pivot pin 61 and 59 in relation to the pivot pin 58 is such that there will be created an over-center lock. Consequently in either position of the linkage, the beam 40 will be locked against movement.

Extending forwardly from the link 57 is an arm or lever 65 having at its forward end a transverse gripping rod 66. The lever 65 may be manually operated to control movement of the linkage between its retracted and extended position.

Reviewing the implement as a whole and referring specifically to FIGS. 3, 4, it becomes apparent in order to raise the teeth 41 from their ground-engaging position, the linkage 55 must be retracted from its extended position as shown in FIG. 3. It will be noted in FIG. 3 that the pivot pins 48 are disposed above the pivot pins 47. However, upon swinging the lever 65 forwardly, initial movement of such will cause the pin 48 to move forwardly relative to the pin 47. After moving from the over-center locking position of the linkage as shown in FIG. 3, the weight of the blade 35 and the end walls 36, 37 will tend to counter-balance the weight of the beam 40 and its associated scarifier teeth 41. The gravitational effect of the blade 35 as it moves toward the ground will operate as a force to aid in raising the scarifier teeth 41 upwardly and into a position shown in FIG. 4. For this reason, there will not be a great deal of force required on the lever 65 in order to reposition the scarifying teeth 41 from a first position in which they are directed downwardly and into the ground and a second position in which they are directed rearwardly and clear of the ground.

In a similar vein, in order to lower the blade 35 from a position shown in FIG. 4, it is necessary to swing the control lever 65 rearwardly to release the over-center lock on the linkage 55. However, upon initial movement of the control lever 65 rearwardly, the linkage will cause the beam 40 to swing rearwardly of its pivot 46 and consequently from this point in its counter-clockwise movement, it will operate through its gravitational effect to raise the blade 35 about its horizontal pivot 48. Therefore, the actual manual force required to change the position is relatively small.

While only one form of the invention has been shown, it should be recognized that other forms and variations will occur to those skilled in the art. Therefore, it should be understood that while the present disclosure was shown and described in detail, it was the purpose in so doing to fully explain the principles of the invention and it was not the intention to limit or narrow the invention beyond the broad concepts set forth in the appended claims.

What is claimed is:

1. A combination scraper-scarifier implement comprising: an upright frame; a transverse scraper blade disposed behind the upright frame and having opposite ends of the blade; end frameworks extending forwardly from opposite ends of the blade; a transverse beam forward of the blade extending between the end frameworks; scarifier teeth supported on the beam; structure rigid with the beam extending forwardly therefrom defining first transverse pivot means; means on the lower end of the frame connecting the frame to the first pivot means whereby the beam may swing vertically about the pivot means; structure extending forwardly from opposite ends of the beam defining second transverse pivot means spaced from the first pivot means and effective to move in a vertical arc forward of the first pivot means as the beam is raised and lowered; a stabilizing link extending from an upper portion of the frame to the blade; means mounting the end frameworks on the second pivot means; and linkage means adaptable for extension and retraction extending between the frame and the beam and effective upon retraction and extension to raise and lower respectively the beam between a first position in which the beam is rearward of the first pivot means and the scarifier teeth are depending in ground engaging position, the second pivot means are in a high position relative to the first pivot means and the blade is raised from the ground, and a second position in which the beam is generally above the first pivot means and the scarifier teeth are extending rearwardly, the second pivot means are in a low position relative to the first pivot means and the blade is in a ground engaging position, said linkage means being so arranged to have over-center locks when the beam is in both its first or second positions.

2. A combination scraper-scarifier implement comprising: an upright frame; a transverse scraper blade disposed behind the upright frame and having opposite ends; a transverse beam forward of the blade; scarifier teeth supported on the beam; structure rigid with the beam extending forwardly therefrom defining first and second transverse pivots, the second pivots being forward of the first; means on the lower end of the upright frame connecting the frame to the first of the transverse pivots; a stabilizing link extending from an upper portion of the frame to the blade; forwardly extending arm means mounting the blade on the second of the transverse pivots; and linkage means adaptable for extension and retraction extending between the frame and the beam and effective to raise and lower the beam between a first position in which the beam is rearward of the first of the transverse pivots and the scarifier teeth are depending in the ground engaging position, the second of the transverse pivots are in a high position relative to the first of the transverse pivots and the blade is raised from the ground, and a second position in which the beam is generally above the first of the transverse pivots and the scarifier teeth are extending rearwardly, the second of the transverse pivots are in a low position relative to the first of the transverse pivots and the blade is in a ground engaging position, said linkage means being so arranged to have over-center locks when the beam is in both its first or second positions.

3. A combination scraper-scarifier implement comprising: an upright frame; a transverse scraper blade disposed behind the upright frame and having opposite ends; a transverse beam forward of the blade; scarifier teeth supported on the beam; structure rigid with the beam extending forwardly therefrom defining first and second transverse pivots, the second pivots being forward of the first; means on the lower end of the upright frame connecting the frame to the first of the transverse pivots; a stabilizing link extending from an upper portion of the frame to the blade; forwardly extending arm means mounting the blade on the second of the transverse pivots and linkage means adaptable for extension and retraction extending between the frame and the beam and effective to raise and lower the beam between a first position in which the beam is rearward of the first of the transverse pivots and the scarifier teeth are depending in the ground engaging position, the second of the transverse pivots are in a high position relative to the first of the transverse pivots and the blade is raised from the ground, and a second position in which the beam is generally above the first of the transverse pivots and the scarifier teeth are extending rearwardly, the second of the transverse pivots are in a low position relative to the first of the transverse pivots and the blade is in a ground engaging position.

4. A combination scraper-scarifier implement comprising: an upright frame; a transverse scraper blade disposed behind the upright frame and having opposite ends; a transverse beam forward of the blade; scarifier teeth supported on the beam; structure rigid with the beam defining first and second transverse pivots the latter being forward of the former; means on the upright frame connecting the frame to the first of the transverse pivots; a stabilizing link extending from the frame to the blade; forwardly extending arm means mounting the blade on the second of the transverse pivots; said link and said first and second pivots being so disposed relative to each other whereby said blade will rise and fall in reverse order to raising and lowering of the beam; and means extending between the frame and the beam effective to raise and lower the beam.

5. The invention defined in claim 4 in which the means for raising and lowering the beam is in the form of manually adjustable linkage and the relative position of the first and second pivots and the distance between the pivots and the effective specific centers of gravity of the blade and beam are such that the gravitational effect of one will substantially counter-balance the required force to raise the other.

6. The invention defined in claim 6 further characterized by the linkage means having over-center locking positions effective to lock the blade and beams in their pre-determined raised and lowered position.

7. The invention defined in claim 6 further characterized by the frame being an A-frame and the stabilizing link extends from the upper apex portion of the frame to the top edge of the blade.

References Cited in the file of this patent

UNITED STATES PATENTS

| | | |
|---|---|---|
| 1,192,388 | Carlson | July 25, 1916 |
| 2,839,851 | Geiszler | June 24, 1958 |
| 2,865,117 | Davis | Dec. 23, 1958 |
| 2,986,828 | Lapins | June 6, 1961 |

UNITED STATES PATENT OFFICE
CERTIFICATE OF CORRECTION

Patent No. 3,069,791                      December 25, 1962

John L. French

It is hereby certified that error appears in the above numbered patent requiring correction and that the said Letters Patent should read as corrected below.

Column 6, line 3, for the claim reference numeral "6" read -- 5 --; line 5, for "beams" read -- beam --; same column, line 6, for "position" read -- positions --.

Signed and sealed this 27th day of August 1963.

(SEAL)
Attest:

ERNEST W. SWIDER                             DAVID L. LADD
Attesting Officer                                Commissioner of Patents